M. SOLDATI & F. J. KLAAS.
FENDER.
APPLICATION FILED JULY 31, 1914.

1,126,897.

Patented Feb. 2, 1915.
2 SHEETS—SHEET 1.

Inventors
Martin Soldati and
Frank J. Klaas

Witnesses

By
Attorneys.

M. SOLDATI & F. J. KLAAS.
FENDER.
APPLICATION FILED JULY 31, 1914.
1,126,897.
Patented Feb. 2, 1915.
2 SHEETS—SHEET 2.
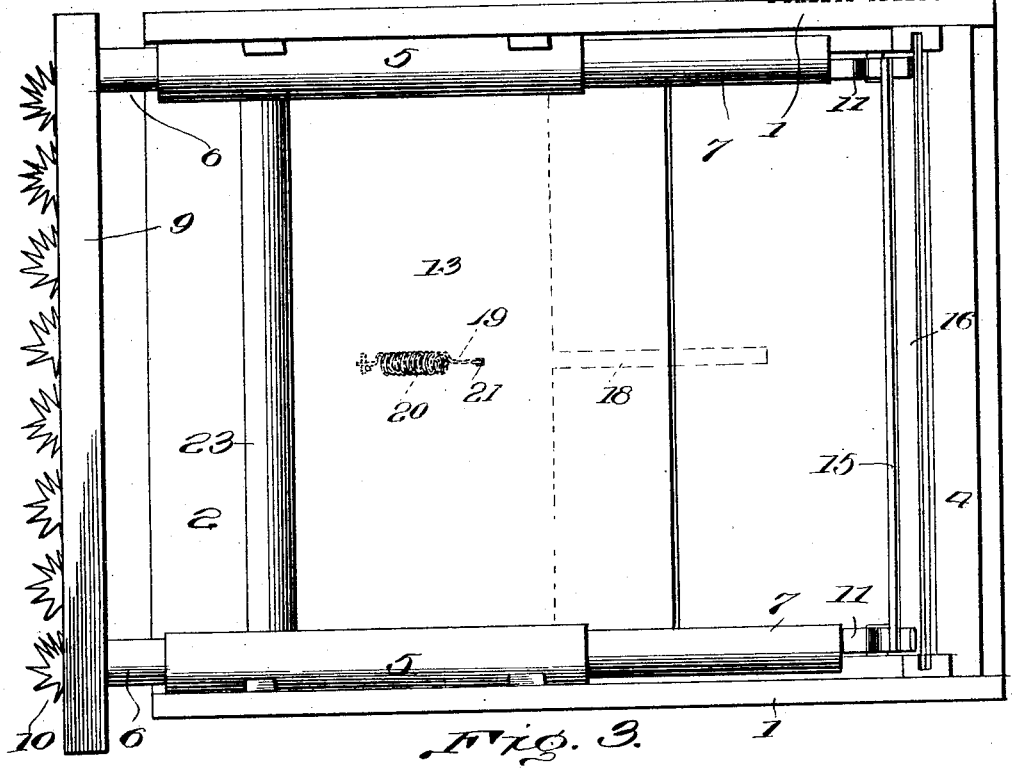
Fig. 3.
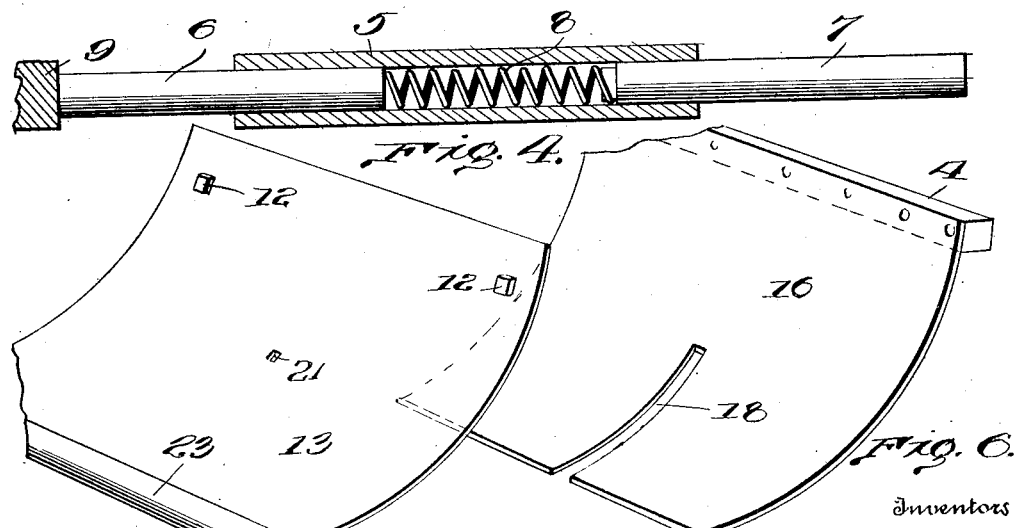
Fig. 4.
Fig. 5.
Fig. 6.
Witnesses
Inventors
Martin Soldati
Frank J. Klaas
By
Attorneys.

UNITED STATES PATENT OFFICE.

MARTIN SOLDATI AND FRANK J. KLAAS, OF WILLOWS, CALIFORNIA.

FENDER.

1,126,897.

Specification of Letters Patent.

Patented Feb. 2, 1915.

Application filed July 31, 1914. Serial No. 854,372.

*To all whom it may concern:*

Be it known that we, MARTIN SOLDATI and FRANK J. KLAAS, citizens of the United States, residing at Willows, in the county of Glenn and State of California, have invented certain new and useful Improvements in Fenders, of which the following is a specification.

This invention relates to fenders for use upon cars or other vehicles and has for its object the provision of a simple and inexpensive apparatus by the use of which any person who may be in the path of the vehicle and struck by the fender will be caught and held by the same and protected from injury due to the vehicle passing over him.

The invention seeks to provide an apparatus in which the blow upon the person will be cushioned so that he will not be subjected to a severe shock and injured through contact with the fender and after he has been struck will be supported and carried by the fender until the vehicle can be stopped.

These stated objects, and such other objects as will incidentally appear as the description of the invention proceeds, are attained in such an apparatus as is illustrated in the accompanying drawings and the invention resides in certain novel features which will be particularly pointed out in the claims following the description.

Figure 1:
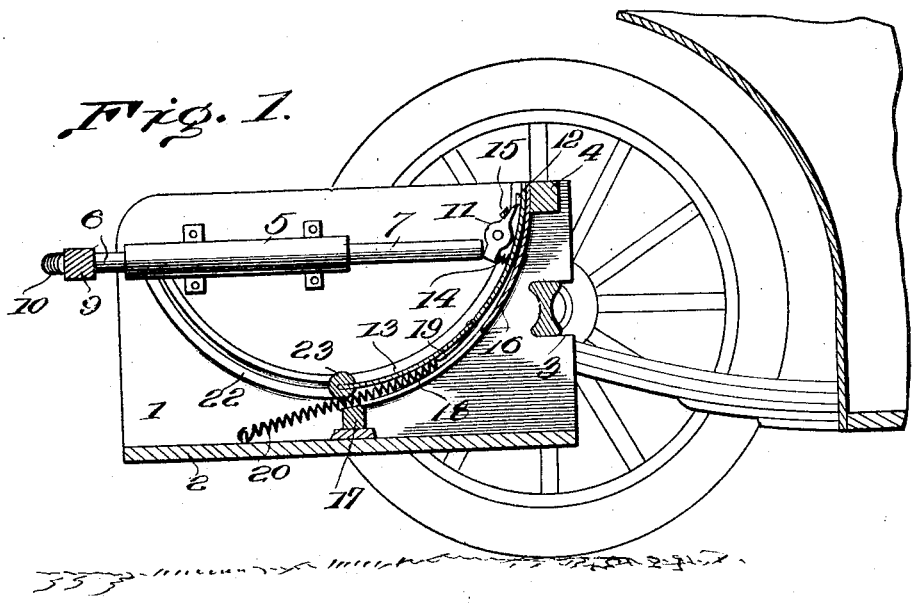
Figure 2:
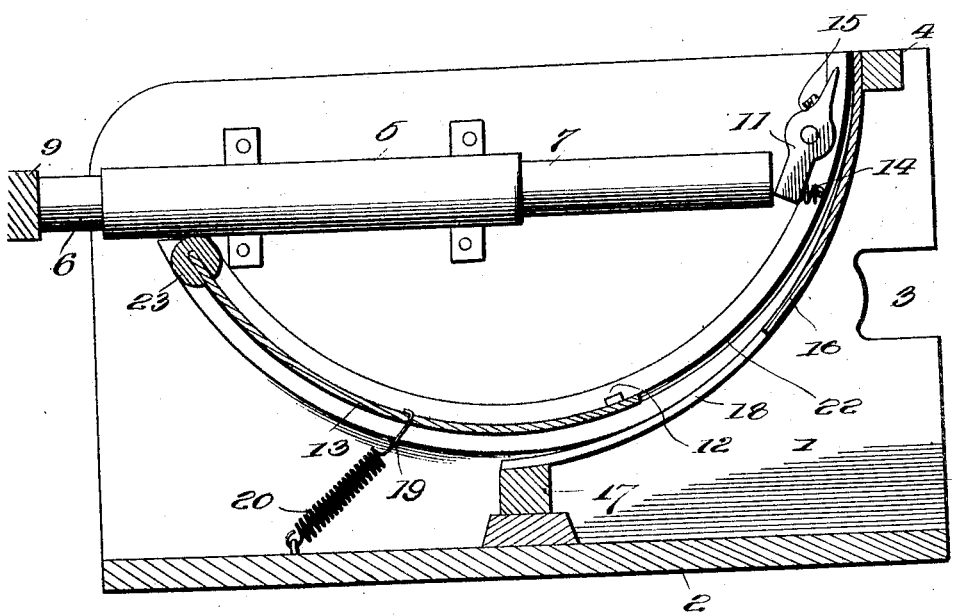

In the accompanying drawings, which illustrate the preferred embodiment of the invention, Figure 1 is a sectional view of our improved fender showing the same applied to an automobile. Fig. 2 is an enlarged sectional view of the fender showing the same as it appears after a person has been caught therein. Fig. 3 is a plan view of the fender in its tripped position. Fig. 4 is a detail sectional view of one of the push bars. Figs. 5 and 6 are detail perspective views of the members of the support.

In carrying out our invention, we employ a main frame which may be of any convenient or preferred construction and is illustrated as consisting of side bars or plates 1 and a bottom or platform 2 connecting the lower edges of said side bars. The side bars are notched, as indicated at 3, or otherwise suitably constructed to fit over the front axle of the vehicle to which the fender is applied. A transverse beam 4 is also provided at the upper rear corners of the side plates so as to connect the same and brace the structure and also provide a support for the upper rear edge of the apron or carrier. Upon the inner faces of the side plates near the front and top edges thereof we secure sleeves 5 which have open ends and which receive the push bar members 6 and 7, as clearly shown, a spring 8 being arranged within each sleeve between the opposed ends of said push bar members, as shown most clearly in Fig. 3. The front ends of the forward push bar members 6 are connected by a fender rail or cross bar 9 which may be of any desired material having the requisite strength and upon the front side of this cross bar 9 we secure a plurality of cushions 10 which are illustrated as consisting of coiled springs having their ends secured to the bar so that the springs will assume an arcuate form with their intermediate portions projecting in advance of the bar. While this construction is desirable on account of its lightness, other forms of cushion may be employed, such as rubber blocks, if so desired. The rear ends of the rear push bar members 7 bear against the lower ends of pawls or latches 11 which are pivotally mounted upon the side plates 1 and have their upper ends adapted to engage lugs 12 upon the movable apron member or carrier 13 at the upper rear corners of the same. The latches or pawls 11 are held against the said push bar members 7 and in engagement with the said lugs 12 by springs 14 which are arranged between the lower ends of the latches and the supporting frame and secured in place in any desired manner. To prevent the upper ends of the latches being thrown too far from the apron, when the device is operated, we provide a guard or stop 15 which may be of any preferred or convenient construction but is illustrated as consisting of a solid strip secured to the side plates 1 and extending transversely between the same above and to the rear of the pivots of the latches. When the upper ends of the latches are thrown forward in the operation of the apparatus, the forward edges of the latches will impinge against this stop and they will consequently be prevented from swinging so far forward as to break the springs 14 or otherwise render the device inoperative. The carrier consists of an apron 16 which is secured to the cross bar 4 and extends downwardly and forwardly therefrom on an arc forming substantially a quarter of a circle, the lower edge of said member being secured to a cross bar 17 or other fixed part of the frame and a longitudinal slot 18 being formed in the apron to accommodate the rear portion 19 of a spring 20 which is attached to and actuates the movable apron 13. This movable apron 13 is an arcuate plate provided with an opening 21 which receives the extremity of the end portion 19 of the spring 20, as shown, and the said plate is slidably mounted in arcuate guides or ways 22 provided upon the inner faces of the side plates 1, as seen most clearly in Fig. 2. The front edge of this movable apron 13 is provided with a buffer 23 which may be of any desired material or construction and is preferably a heavy roll of rubber rigidly secured to and extending over the front edge of the apron throughout the length of the same, as shown and as will be readily understood.

In the normal position of the apparatus, the movable apron 13 is pushed rearwardly in the guides 22 so as to lie over the apron 16 and be held in said retracted position by the latches 11 engaging under the lugs 12, as shown in Fig. 1. The rear push bar members 7 have their ends bearing against the lower ends of the latches and the spring 20 will be under tension. The cross bar 9 projects in advance of the supporting frame and the front push bar members 6 which support said cross bar are free to slide in the sleeves 5. Should a person or object in the path of the vehicle be struck by the cross bar, the blow will move the said members 6 inwardly in the guides 5 and thereby compress the springs 8 which will react upon the rear push bar members 7 and cause the same to bear with increased pressure upon the lower ends of the latches so as to overcome the tension of the springs 14 and swing said latches about their pivots, whereupon the upper ends of said latches will be released from the lugs 12. The spring 20 will then at once contract and will draw the movable apron 13 downwardly and forwardly so that the person or object struck by the front fender or cross bar 9 and falling over said bar will be received and supported by the aprons 13 and 16. The vehicle consequently will not run over the person, who will be saved from serious injury. The cushions 10 serve to prevent injury to the person through contact with the bar 9 and the springs 8 will be so adjusted as to hold the member 6 forwardly in the sleeves or tubular springs 5 without projecting them from the supports and the springs will yield readily to the blow upon the cross bar, so that the members 7 will impart a sudden sharp impulse to the latches 11 and release them instantly from their engagement with the lugs 12.

It will thus be seen that we have provided an exceedingly simple and quickly acting fender by which a person falling over the front cross bar will be caught and held above the ground and carried until the vehicle can be stopped. As the apron 13 is normally held in a rear upper position, it will not tend to catch and hold large quantities of dust and mud and will not be apt to be injured through contact with low bushes or similar obstructions which may be encountered.

Having thus described the invention, what we claim as new, is:—

1. In a fender, the combination of a support, a carrier mounted on the support, latches for holding the carrier normally retracted, and actuating devices comprising front and rear push bars, the rear push bars being in engagement with the latches, springs between the said front and rear push bars, and a blow receiving member carried by the front push bars.

2. In a fender, the combination of a support, a carrier mounted thereon, latches pivotally mounted upon the support and engaging said carrier, means for limiting the movement of said latches, means for holding said latches normally in engagement with the carrier, and means actuated by impact with an object in the path of the fender for releasing said latches from the carrier.

3. In a fender, the combination of a support, a carrier mounted thereon, a cross bar in advance of the support, a cushion on the front side of said cross bar, front push bar members slidably mounted on the support and secured to and extending rearwardly from said cross bar, rear push bar members slidably mounted upon the support, yieldable connections between the push bar members, and means in engagement with the rear push bar members to hold the carrier normally retracted and adapted to be released from said carrier when the front push bar members are actuated.

4. In a fender, the combination of a support, a carrier slidably mounted upon the said support, and provided with lugs upon its forward face, latches mounted upon the support and adapted to engage said lugs to hold the carrier normally retracted, means for holding the latches normally in engagement with the said lugs, means for actuating said latches, and a spring secured to the carrier and the support and projecting the carrier upon release of the latches.

5. In a fender, the combination of a support, a carrier slidably mounted thereon, latches pivotally mounted upon the support and having their upper ends adapted to engage the carrier to hold the same retracted, springs secured upon the support and bearing upon the lower ends of the latches to hold them normally in engagement with the carrier, and push bar members bearing upon the lower ends of the latches in opposition to said springs to disengage the latches from the carrier under impact upon said push bar members.

6. In a fender, the combination of a support, an arcuate plate secured to said support and provided with a longitudinal slot in its lower forward portion, ways on the support above said plate, a carrier slidably mounted in said ways, a spring secured to the carrier and the support and adapted to play in the said longitudinal slot, means on the support for holding the carrier normally in position over the said arcuate plate, and means for releasing said holding means.

In testimony whereof we affix our signatures in presence of two witnesses.

MARTIN SOLDATI.
FRANK J. KLAAS.

Witnesses:
L. M. NAGEL,
M. GOLDEN.

Copies of this patent may be obtained for five cents each, by addressing the "Commissioner of Patents, Washington, D. C."